(12) United States Patent
Koller et al.

(10) Patent No.: US 12,325,362 B2
(45) Date of Patent: Jun. 10, 2025

(54) DISPLAY SYSTEM, VEHICLE AND METHOD

(71) Applicant: MOTHERSON INNOVATIONS COMPANY LIMITED, London (GB)

(72) Inventors: Matthias Koller, Stuttgart (DE); Alexander Slama, Stuttgart (DE); Shuvodeep Das, Noida (IN)

(73) Assignee: Motherson Innovations Company Limited, London (GB)

( * ) Notice: Subject to any disclaimer, the term of this patent is extended or adjusted under 35 U.S.C. 154(b) by 193 days.

(21) Appl. No.: 18/190,400

(22) Filed: Mar. 27, 2023

(65) Prior Publication Data
US 2023/0311773 A1 Oct. 5, 2023

(30) Foreign Application Priority Data
Mar. 30, 2022 (DE) ...................... 10 2022 107 620.2

(51) Int. Cl.
*B60R 1/28* (2022.01)
*H04N 7/18* (2006.01)

(52) U.S. Cl.
CPC ............. *B60R 1/28* (2022.01); *H04N 7/183* (2013.01); *B60R 2300/307* (2013.01); *B60R 2300/802* (2013.01)

(58) Field of Classification Search
CPC ................ B60R 1/28; B60R 2300/307; B60R 2300/802; H04N 7/183
See application file for complete search history.

(56) References Cited

U.S. PATENT DOCUMENTS

| 10,613,369 | B2 * | 4/2020 | Li | ........................ H04M 1/02 |
| 2018/0134217 | A1 * | 5/2018 | Peterson | ................ G08G 1/167 |
| 2020/0201088 | A1 * | 6/2020 | Yao | ........................ G02F 1/1323 |
| 2021/0181549 | A1 * | 6/2021 | Kim | ................ G02F 1/133512 |

(Continued)

FOREIGN PATENT DOCUMENTS

WO WO-2021242245 A1 * 12/2021

OTHER PUBLICATIONS

German IP, Appl. 10 2022 107 620.2, Office Action, Nov. 29, 2022.

*Primary Examiner* — Fernando Alcon
(74) *Attorney, Agent, or Firm* — Jones Day (57) ABSTRACT

The present disclosure relates to a display system for a vehicle, comprising: at least one camera module configured to capture a field-of-view (FOV) in a scenery at least partly around the vehicle; at least one display unit configured to display the captured FOV, wherein the display unit has a plurality of viewing angles; at least one filter configured to selectively allow at least one viewing angle (VA) out of the plurality of viewing angles, wherein the filter is positioned on or over the display unit; and at least one processing unit configured to operate the filter in either an enabled state or a disabled state, wherein the filter allows exhibition of the FOV in the at least one viewing angle (VA) of the plurality of viewing angles in an event the filter is in the enabled state, with the at least one viewing angle (VA) being a subset of the plurality of viewing angles, and the filter allows exhibition of the FOV in all of the plurality of viewing angles in an event the filter is in the disabled state. It also relates to a vehicle with such a display system and a method for operating the same.

20 Claims, 5 Drawing Sheets

(56) References Cited

U.S. PATENT DOCUMENTS

2021/0200002 A1\* 7/2021 Kim .................... G02B 5/0231
2024/0019725 A1\* 1/2024 He ..................... G02F 1/13345
2024/0385472 A1\* 11/2024 Chen ................... G02B 6/0055

\* cited by examiner

DISPLAY SYSTEM, VEHICLE AND METHOD

CROSS-REFERENCE TO RELATED APPLICATION

This application claims priority to German Patent Application No. DE 10 2022 107 620.2, filed on Mar. 30, 2022, which is incorporated by reference herein in its entirety.

FIELD

The present disclosure refers to an opto-electronic apparatus related to internal parts of motor vehicles. More particularly, the present disclosure relates to a display system for a motor vehicle, a vehicle with such a display system as well as a method of operating a display system for a motor vehicle for displaying scenery around the motor vehicle.

BACKGROUND

Generally, motor vehicles have a pair of external rear vision mirrors placed at either side of the vehicle to obtain a clear sight of the rear end of the vehicle. The mirrors are typically an assembly of mechanical and/or electro-mechanical components. Typically, the assembly is inclusive of a mirror head that is designed to rotate, in either forward or rearward directions, about a substantially vertical pivot axis. The mirror head is the component which is adjusted with respect to the driving position such that a rear-view of the vehicle is obtained, either manually or through motor.

However, in modern vehicles, the motorized or manual mirrors are supplemented by or replaced with camera monitoring systems (CMS systems). Mirrors may be replaced with one or more cameras mounted on the same or different locations of the mirrors, and one or more screens of display units may be placed inside the cabin of a vehicle. A screen is to show the exact field of view (FOV) captured by the cameras to resemble the mirror image. In a practical example, the side mirrors are replaced with a left camera and right camera which is facilitated by two screens mounted inside the left side and the right side of the cabin. The left-side screen shows the image or real-time video captured by the left camera while the right-side screen shows the image or real-time video captured by the right camera.

The use of such screens may have many pros and cons while one of the drawbacks associated with such system or arrangement is that the co-passenger sitting on the front side often faces motion-sickness due to continuously seeing the display mounted near the co-passenger side. In most cases, displaying image to the co-passenger is useless while creating other problems.

Further, there exist screen-filters which filters image or display light in a specific direction; however, the same is static and has to be preset with a greater viewing angle to cater all the possible viewing angle of the driver. Such a system is not appropriate since the greater viewing angle on the screen of the display unit may interfere with an observable angle of the co-passenger in the front seat or the rear occupants.

In view of the aforementioned drawbacks and other inherent in the existing state of the art, it is desirous to have an effective solution to have a display system that limits the viewing angle to only a driver even when the driver seating position changes and yet doesn't exhibit the same disadvantages of the state of the arts.

SUMMARY

Thus, it is the object of the present disclosure to provide a display system for a motor vehicle overcoming the drawbacks of the prior art.

To archive this object, the present disclosure provides a display system for a vehicle, comprising at least one camera module configured to capture a field-of-view (FOV) in a scenery at least partly around the vehicle; at least one display unit configured to display the captured FOV, wherein the display unit as a plurality of viewing angles; at least one filter configured to selectively allow at least one viewing angle (VA) out of the plurality of viewing angles, wherein the filter is positioned on or over the display unit; and at least one processing unit configured to operate the filter in either an enabled state or a disabled state, wherein the filter allows exhibition of the FOV in the at least one viewing angle (VA) of the plurality of viewing angles in an event the filter is in the enabled state, with the at least one viewing angle (VA) being a subset of the plurality of viewing angles, and the filter allows exhibition of the FOV in all of the plurality of viewing angles in an event the filter is in the disabled state.

According to embodiments the filter comprises a plurality of ribs, with the ribs preferably being translucent and/or each extending from the display unit with a specific angle, and/or the filter is configured to filter out light reflected from a smooth surface of the display unit.

Embodiments can be characterized in that the ribs are configured to switch between at least two states, comprising a transparent state, a translucent state and/or an opaque state, the ribs are configured to be switched between at least two states by applying a voltage, and/or the light transmission properties of the ribs are configured to be altered when voltage, light and/or heat is applied.

Further, embodiments can be characterized in that each or a combination of the plurality of ribs is/are switched, and/or electronically enabled or disabled by the processing unit, ribs are in the opaque state in an event they are electronically enabled, and/or ribs are in the transparent state in an event they are electronically disabled.

In line with embodiments of the present disclosure each or a combination of the plurality of ribs, when enabled and/or in the opaque state, define the at least one viewing angle (VA) of the plurality of viewing angles.

Further embodiments are defined in that the processing unit is configured to operate the filter based on detection of at least one event, wherein preferably the at least one event includes a traffic detection, a collision detection, a blind-spot detection, a vehicle turn detection, and/or a lane change detection.

There are embodiments, which further comprise at least one driver detection system, wherein preferably the at least one driver detection system includes a camera focused towards a driver (D), a proximity sensor focused towards the driver (D), a time of flight (TOF) senor and/or a sensor integrated to a seat of the driver (D), and/or wherein preferably the at least one driver detection system is configured to detect a seating position (SP) of the driver (D), the head of the driver (D), the eyes of the driver (D) and/or the viewing direction of the driver (D), in particular in real time.

Further embodiments are defined in that the processing unit is configured to determine a driver-centric viewing angle based on the position of the display unit and an input from the driver detection system, and/or to selectively enable one or the combination of the plurality of ribs based on the position of the display unit and an input from the driver detection system, or to selectively enable one or the combination of the plurality of ribs corresponding to the driver-centric viewing angle out of the plurality of viewing angles of the display unit.

Embodiments may further comprise at least one input module for a user to, in particular manually, feed a custom viewing angle, wherein preferably the processing unit selectively enables one or the combination of the plurality of ribs corresponding to the custom viewing angle out of the plurality of viewing angles of the display unit.

Embodiments of the present disclosure relate to a display system that confines the viewing angle of a display unit of the display system based on detection of the real-time position of the driver, wherein a driver detection system effectively detects the position of the driver and communicates the information to a processing unit. The processing unit then determines the viewing angle based on the information received from the driver detection system and accordingly dynamically enables a filter to confine the viewing angle specific to the position of the driver.

The present disclosure also provides a vehicle with at least one display system described above, wherein each camera module is mounted outside the vehicle, preferably onto the side of the vehicle to capture the FOV at least around the rear end of the vehicle, and each display unit is mounted or mountable inside the cabin of the vehicle such that the FOV captured by the camera module(s) is shown to the driver (D).

It is also proposed that the processing unit is comprised by the vehicle electronic processing unit (ECU), and/or the at least one input module is comprised by a centre console.

Still further, the present disclosure provides a method of operating a display system of a vehicle, comprising a step of capturing a field-of-view (FOV), by at least one camera module, in a scenery at least partly around the vehicle; a step of displaying the FOV by at least one display unit, wherein the display unit has a plurality of viewing angles; a step of selectively allowing, by a filter, at least one viewing angle (VA) out of the plurality of viewing angles, wherein the filter is positioned on or over the display unit; and a step of operating the filter, by a processing unit, in either an enabled state or a disabled state, wherein the filter allows exhibition of the FOV in the at least one viewing angle (VA) of the plurality of viewing angles in an event the filter is in the enabled state, with the at least one viewing angle (VA) being a subset of the plurality of viewing angles, and the filter allows exhibition of the FOV in all the plurality of viewing angles in an event the filter is in the disabled state.

Other aspects, advantages, and salient features of the disclosure will become apparent to those skilled in the art from the following detailed description, which taken in conjunction with the annexed drawings, discloses exemplary embodiments of the disclosure.

BRIEF DESCRIPTION OF THE DRAWINGS

The disclosure itself, together with further features and attended advantages, will become apparent from consideration of the following detailed description, taken in conjunction with the accompanying drawings. One or more embodiments of the present disclosure are now described, by way of example only wherein like reference numerals represent like elements and in which.

The drawings referred to in this description are not to be understood as being drawn to scale except if specifically noted, and such drawings are only exemplary in nature.

DETAILED DESCRIPTION

The term "comprises", "comprising", "including", "having", "consist of" or any other variations indicate non-exclusive inclusion in order to cover a setup, structure or method that comprises a list of components or steps does not include only those components or steps but may include other components or steps not expressly listed or inherent to such setup or structure or method. Meaning thereby, one or more elements in an apparatus proceeded by "comprises . . . a" does not, without more constraints, preclude the existence of other elements or additional elements in the system or apparatus.

For increasing the intelligibility of this disclosure, references are made to the embodiment illustrated in the accompanying Figures and description herein below, further, in the following Figures, the same reference numerals are used to identify the same components in alternative views.

Figure 1:
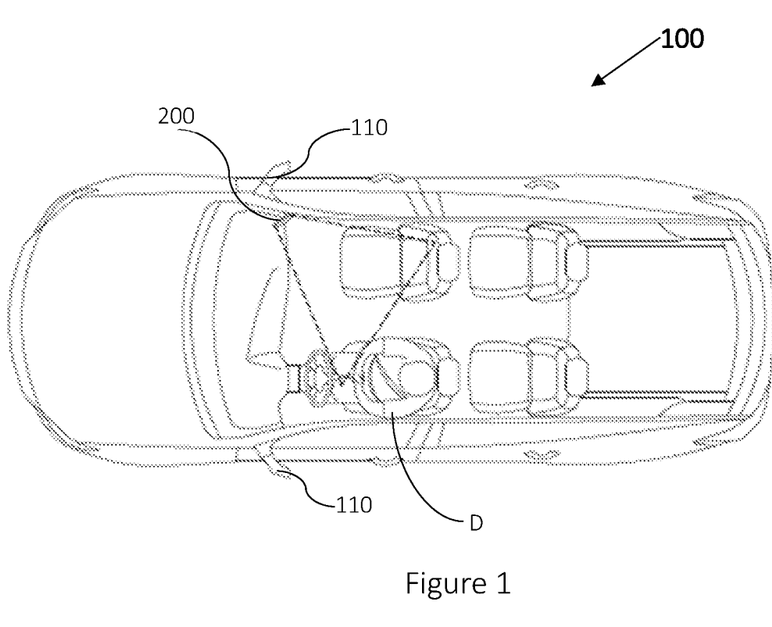
FIG. 1 illustrates a top view of a vehicle configured with a display system having a plurality of viewing angle, in accordance with an exemplary embodiment of the present disclosure.
Figure 2:
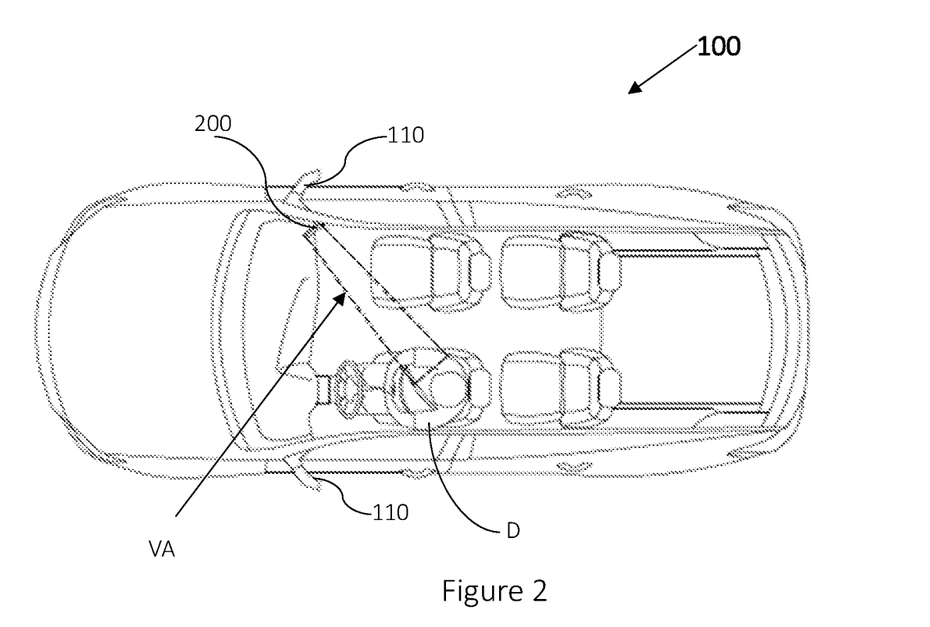
FIG. 2 illustrates a top view of the vehicle of FIG. 1 with a filter of the display system being enabled to restrict one or more viewing angles.

FIGS. 1 and 2 illustrate a display system 200 of a vehicle 100. The display system 200 of the vehicle 100 is an improved solution to display a field-of-view (FOV) at least partly around the vehicle 100, to a driver, D captured by one or more camera modules 110 of the vehicle 100. The display system 200 has a plurality of viewing angles VA to display the captured FOV.

Each camera module 110 may be mounted outside the vehicle 100, and more particularly onto the side of the vehicle 100 to capture the FOV at least partly around the rear end of the vehicle 100. The display system 200 comprises a display unit 210 to exhibit or display the FOV, with further details of the display unit 210 being described with respect to FIG. 4. The display unit is mounted inside the cabin of the vehicle 100 such that the FOV captured by the camera modules 110 is shown to the driver. The display unit 210 has a plurality of viewing angle.

Figure 4:
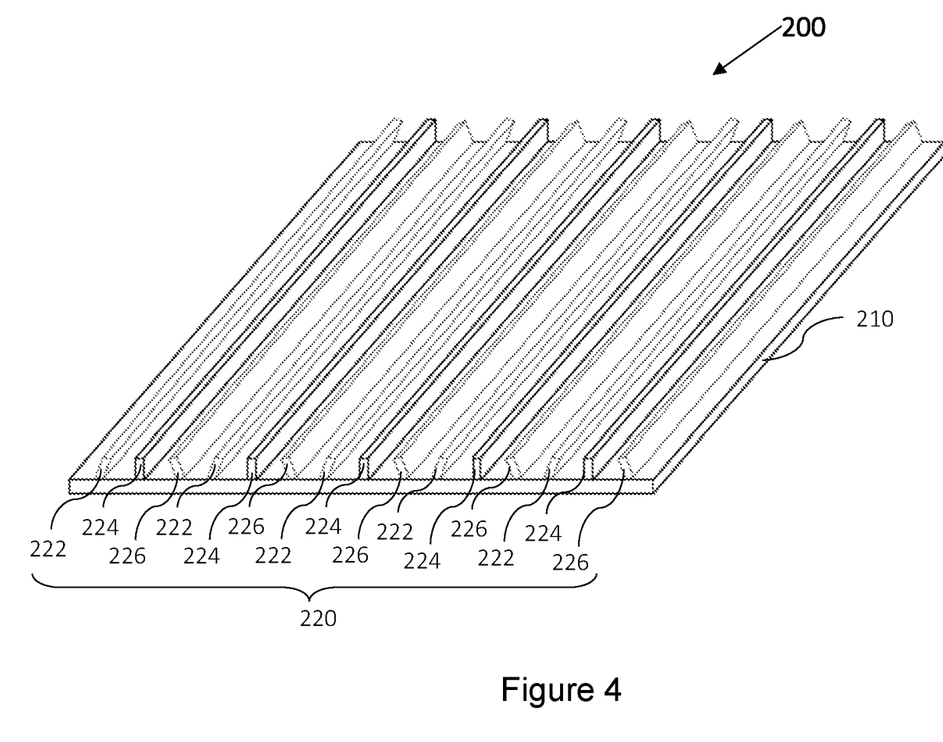
FIG. 4 illustrates a perspective view of a filter integrated onto a display unit to restrict one or more viewing angle, in accordance with an exemplary embodiment of the present disclosure.

Furthermore, the display system 200 comprises a filter 220 integrated such that to selectively allow at least one viewing angle out of the plurality of viewing angles of the display unit 210, with details of the filter 220 being described with respect to FIG. 4. The filter 220 may be positioned on or over the display unit 210. Moreover, the display system 200 has a processing unit (not shown) configured to operate the filter 220 in either an enabled state or a disabled state. As illustrated in FIG. 2, the filter 220 allows exhibition of the FOV in at least one viewing angle VA of the plurality of viewing angles in an event the filter 220 is in the enabled state, while the filter 220 allows exhibition of the FOV in all the plurality of viewing angles in an event the filter 220 is in the disabled state, see FIG. 1.

The filter 220 may comprise a plurality of translucent ribs 222, 224, 226. Each or a combination of the plurality of translucent ribs are electronically enabled and disabled by a microcontroller of the processing unit. Further, each or the combination of the plurality of translucent ribs, when in the enabled state, correspond to the at least one viewing angle of the plurality of viewing angles. The processing unit may be configured to operate the filter 220 in either the enabled state or the disabled state based on detection of at least one event. The at least one event may include a traffic detection, a collision detection, a blind-spot detection, a vehicle turn detection, and a lane change detection.

Figure 3A:
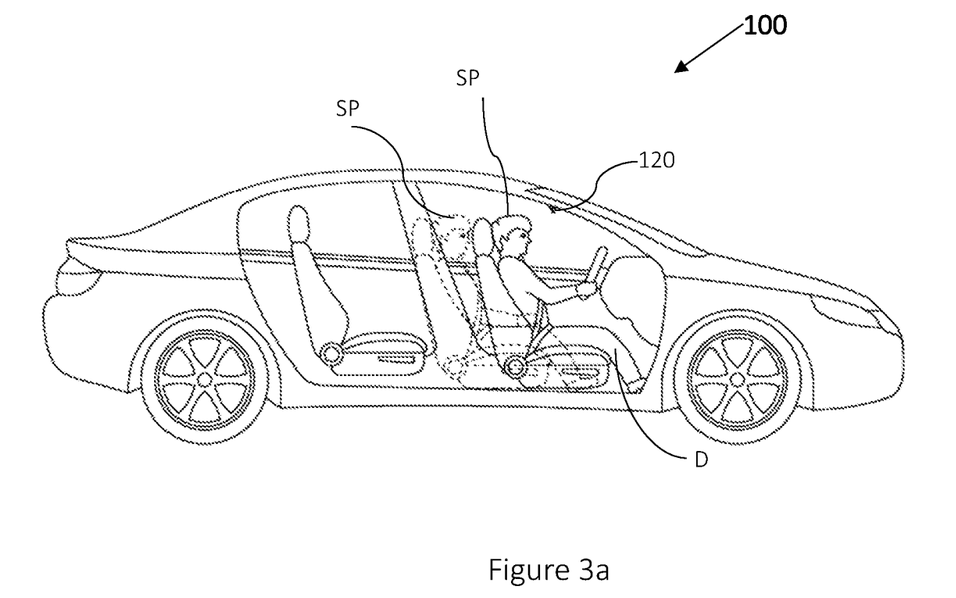
FIGS. 3*a* and 3*b* illustrate each a side view of the vehicle having a driver detection system to detect different seating positions of the driver, in accordance with an exemplary embodiment of the present disclosure.
Figure 3B:
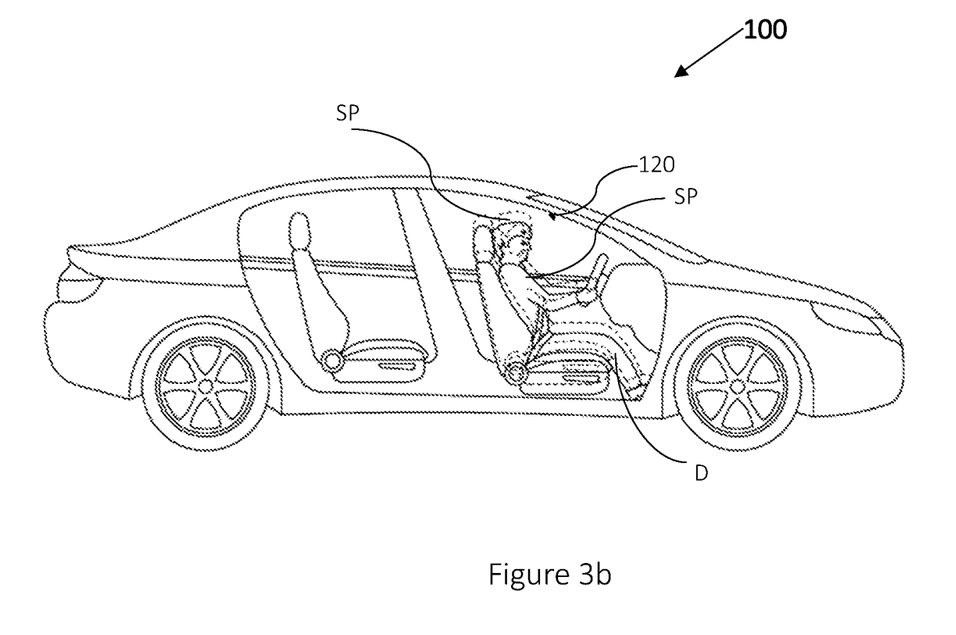

The display system 200 further comprises a driver detection system 120 as shown in FIGS. 3a and 3b. The at least one driver position detection system 120 may include a camera focused towards the driver, a proximity sensor focused towards the driver, a sensor integrated to a seat of the driver or any combination thereof. The processing unit may be configured to determine a driver-centric viewing angle based on the position of the display unit 210 and an input from the driver detection system 120.

The processing unit is further configured to selectively enable one or a combination of the plurality of translucent ribs corresponding to the driver-centric viewing angle out of the plurality of viewing angles of the display unit 210 based on the position of the display unit 210 and an input from the driver detection system 120. In yet another embodiment, the display system 200 comprises an input module for the user/driver to manually feed a custom viewing angle, and accordingly the processing unit selectively enables one or a combination of the plurality of translucent ribs corresponding to the custom viewing angle out of the plurality of viewing angles of the display unit 210.

The camera module 110, as used hereinabove, is configured to capture a field-of-view (FOV) in a scenery at least partly around the vehicle 100. The camera module 110 may be a high-resolution camera configured to take night and day images as may be required for viewing rear end, front end or 360-degree view of the vehicle 100.

The display unit 210, as used hereinabove, is an output device configured to display a static image, a dynamic image (video) or a combination thereof. The display unit 210 may inter-alia include a liquid crystal display (LCD) and/or a light-emitting diode (LED) display.

The filter 220, as used hereinabove, is configured to filter out the light reflected from the smooth glass surface of the display unit 210. The filter 220 decreases the viewing angle of the display unit 210, preventing it from being viewed from the side or all viewing angles of the display unit 210. The filter 220 may be an accessory which can be placed onto the display unit 210 or the display unit 210 and the filter 220 may be integrally formed for the above purpose. The filter 220 comprises an array of preferably translucent, ribs 222, 224, 226. The ribs are configured to be switched between an opaque state or a translucent and a transparent state. The light transmission properties of the ribs are altered when voltage, light, or heat is applied.

In general, when the ribs change from the transparent state to the translucent state (and vice versa), they are changing from letting light pass through to blocking some or all wavelengths of light (and vice versa). In the opaque state, all the light rays are blocked. Usually, the ribs are switched between its states by electronically applying voltage via the processing unit. The voltage is applied in a controlled manner and as and when required by the processing unit.

The processing unit, as used hereinabove, configured to electronically enable and disable the filter 220 such that allow exhibition of the FOV in the display unit 210 in at least one viewing angle VA of the plurality of viewing angles in an event the filter 220 is in the enabled state. The processing unit may be part of the vehicle electronic processing unit (ECU), also known as an electronic control module (ECM), which is an embedded system in automotive electronics that controls one or more of the electrical systems or subsystems in the vehicle 100. The development of the processing unit involves both hardware and software required to perform the functions expected from a particular module. The hardware may include but not limited to a general purpose or a special purpose microcontroller or microprocessor.

As illustrated in FIGS. 3a and 3b, different positions of the driver D are detected based on different seating positions SP of the driver D. The driver seat may be equipped with one or more sensor configured to detect movement of the seat and final position in all axial directions i.e. any lateral and vertical movements. Further, the final position of the seat may be communicated, stored and used by the processing unit.

In addition or alternatively, the different positions of the driver D may be determined by detecting the head of the driver D. The vehicle 100 may be equipped with a time of flight (TOF) sensor or an image sensor or a camera configured to detect movement of the head of the driver in real-time and final position in all axial directions i.e. any lateral and vertical movements. Further, the final position of the head of the driver may communicated, stored and used by the processing unit.

Illustrated in FIG. 4 is the filter 220 integrated onto the display unit 210 of the vehicle 100. The filter 220 comprises an array of ribs 222, 224, 226, as already mentioned, which are configured to be switched between e.g. an opaque state and a transparent state. The ribs are turned opaque when enabled by the processing unit. More particularly, the plurality of ribs or array of ribs have different sets of ribs configured at a predefined angle VA to allow light to reflect from the display unit 210 in a specific direction. There may have a combination of ribs with different angles. In one embodiment, the filter 220 is constructed with a first set of ribs 222, a second set of ribs 224 and a third set of ribs 226, each set being defined by a predefined angle.

In case the first set of ribs 222 is enabled, they let the light to reflect at a particular first angle from the display unit 210, thus creating a first viewing angle. In case, the second set of ribs 224 is enabled, they let the light to reflect at a particular second angle from the display unit 210, thus creating a second viewing angle. In case the third set of ribs 226 is enabled, they let the light to reflect at a particular third angle from the display unit 210, thus creating a third viewing angle.

But also a combination of ribs 222, 224, 226 may be enabled to create a custom viewing angle VA. Thus, according to the present disclosure, the processing unit determines the viewing angle VA required for the driver D based on input from the driver detection system 120 and accordingly enables ribs 222, 224, 226 or a combination of ribs 222, 224, 226 to create the viewing angle VA customised only to the driver D. In yet another embodiment, the processing unit may determine the viewing angle as may suitable required by the driver.

Further, the display system 200 may have the input module which may be a centre console to manually feed/enter a custom viewing angle VA desired by the driver D. Based on the manual input received from the driver, the processing unit determines the ribs 222, 224, 226 required to be enabled to create the desired viewing angle, and selectively enables the required ribs 222, 224, 226.

Figure 5:
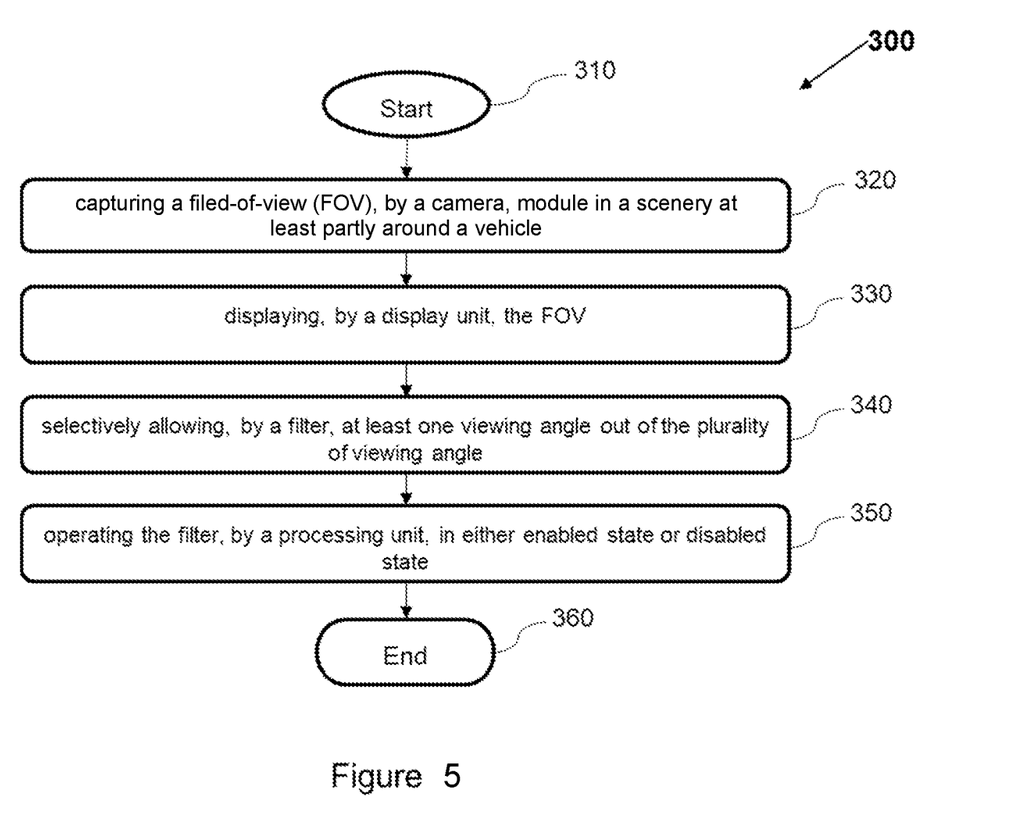
FIG. 5 illustrates a method flow chart for operating the display system of the vehicle, in accordance with an exemplary embodiment of the present disclosure.

As illustrated in FIG. 5, a method 300 for operating the display system 200 of the vehicle 100, initiated at step 310, comprises the following steps:

At step 320, a field-of-view (FOV) of the camera module 110 in a scenery at least around the vehicle 100 is captured by the camera module 110.

At step 330, the FOV is being displayed by the display unit 210. The display unit 210 has a plurality of viewing angles.

At step 340, at least one viewing angle out of the plurality of viewing angles is selectively allowed by the filter 220. The filter 220 is positioned on or over the display unit 210.

At step 350, the filter 220 is operated by the processing unit in either the enabled state or the disabled state. The filter 220 allows exhibition of the FOV in at least one viewing angle of the plurality of viewing angles in an event, the filter 220 is in the enabled state, while the filter 220 allows exhibition of the FOV in all the plurality of viewing angles in an event the filter 220 is in the disabled state.

Further, the present disclosure advantageously encompasses that the display system 200 confines a viewing angle of the display unit 210 based on detection of the real-time position of the driver. The driver detection system 120 effectively detects the position of the driver and communicates the information to the processing unit. The processing unit then determines the viewing angle based on the information received from the driver detection system 120 and accordingly dynamically enables the filter 220 such that confine the viewing angle only specific to the position of the driver.

In summary, the present disclosure provides a switchable privacy screen for a CMS.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

REFERENCE SIGNS

100 Vehicle
110 Camera module
120 Driver detection system
200 Display system
210 Display unit
220 Filter
222 First set of ribs
224 Second set of ribs
226 Third set of ribs
300 Method
320 to 360 Method steps
SP Seating position
VA Viewing angle
D Driver

The invention claimed is:

1. A display system for a vehicle, comprising:
a camera module configured to capture a field-of-view (FOV) in a scenery at least partly around the vehicle;
a display unit configured to display the captured FOV, wherein the display unit has a plurality of viewing angles;
a filter configured to selectively allow at least one viewing angle (VA) out of the plurality of viewing angles, wherein the filter is positioned on or over the display unit; and
a processing unit configured to operate the filter in either an enabled state or a disabled state,
wherein the filter allows exhibition of the FOV in the at least one viewing angle (VA) of the plurality of viewing angles when the filter is in the enabled state, with the at least one viewing angle (VA) being a subset of the plurality of viewing angles,
wherein the filter allows exhibition of the FOV in all of the plurality of viewing angles when the filter is in the disabled state,
wherein the filter comprises a plurality of ribs, and wherein each or a combination of the plurality of ribs are switched or electronically enabled or disabled by the processing unit, and
wherein ribs are in an opaque state when electronically enabled and in a transparent state when electronically disabled.

2. The display system according to claim 1, wherein the plurality of ribs are translucent.

3. The display system according to claim 1, wherein the plurality of ribs each extend from the display unit with a specific angle.

4. The display system according to claim 1, wherein the filter is configured to filter out light reflected from a smooth surface of the display unit.

5. The display system according to claim 1, the plurality of ribs are configured to be switched between at least two states by applying a voltage.

6. The display system according to claim 1 wherein light transmission properties of the plurality of ribs are configured to be altered when voltage, light and/or heat is applied.

7. The display system according to claim 1, wherein ribs, when electronically enabled, define the at least one viewing angle (VA) of the plurality of viewing angles.

8. The display system of claim 1, wherein the processing unit is configured to operate the filter based on detection of at least one event.

9. The display system of claim 8, wherein the at least one event includes one or more of a traffic detection, a collision detection, a blind-spot detection, a vehicle turn detection, or a lane change detection.

10. A display system for a vehicle, comprising:
a camera module configured to capture a field-of-view (FOV) in a scenery at least partly around the vehicle;
a display unit configured to display the captured FOV, wherein the display unit has a plurality of viewing angles;
a filter configured to selectively allow at least one viewing angle (VA) out of the plurality of viewing angles, wherein the filter is positioned on or over the display unit;
a processing unit configured to operate the filter in either an enabled state or a disabled state; and
a driver detection system,
wherein the filter allows exhibition of the FOV in the at least one viewing angle (VA) of the plurality of viewing angles when the filter is in the enabled state, with the at least one viewing angle (VA) being a subset of the plurality of viewing angles, wherein the filter allows exhibition of the FOV in all of the plurality of viewing angles when the filter is in the disabled state.

11. The display system of claim 10, wherein the driver detection system includes one or more of a camera focused towards a driver, a proximity sensor focused towards the driver, a time of flight (TOF) senor, or a sensor integrated to a seat of the driver.

12. The display system of claim 10, wherein the driver detection system is configured to detect, in real time, one or more of a seating position of a driver, a head of the driver, eyes of the driver, or a viewing direction of the driver.

13. The display system of claim 10, wherein the processing unit is configured to determine a driver-centric viewing angle based on a position of the display unit and an input from the driver detection system.

14. The display system of claim 10, wherein the processing unit is configured to selectively enable one or a combination of the plurality of ribs based on a position of the display unit and an input from the driver detection system.

15. The display system of claim 10, wherein the processing unit is configured to selectively enable one or a combination of the plurality of ribs corresponding to a driver-centric viewing angle out of the plurality of viewing angles of the display unit.

16. The display system of claim 1, further comprising:
an input module for a user to input a custom viewing angle,
wherein the processing unit selectively enables one or a combination of the plurality of ribs corresponding to the custom viewing angle out of the plurality of viewing angles of the display unit.

17. A vehicle with at least one display system according to claim 1, wherein
the camera module is mounted outside the vehicle to capture the FOV at least around a rear end of the vehicle, and
the display unit is mounted or mountable inside a cabin of the vehicle such that the FOV captured by the camera module is shown to a driver.

18. The vehicle according to claim 17, wherein the processing unit is comprised by a vehicle electronic processing unit (ECU).

19. The vehicle according to claim 16, wherein the input module is comprised by a center console.

20. A method of operating a display system of a vehicle, comprising:
capturing a field-of-view (FOV), by a camera module, in a scenery at least partly around the vehicle;
displaying the FOV by a display unit, wherein the display unit has a plurality of viewing angles;
selectively allowing, by a filter, at least one viewing angle out of the plurality of viewing angles, wherein the filter is positioned on or over the display unit; and
operating the filter, by a processing unit, in either an enabled state or a disabled state, wherein
the filter allows exhibition of the FOV in the at least one viewing angle (VA) of the plurality of viewing angles when the filter is in the enabled state, with the at least one viewing angle (VA) being a subset of the plurality of viewing angles,
the filter allows exhibition of the FOV in all the plurality of viewing angles when the filter is in the disabled state,
the filter comprises a plurality of ribs, and wherein each or a combination of the plurality of ribs are switched or electronically enabled or disabled by the processing unit, and
ribs are in an opaque state when electronically enabled and in a transparent state when electronically disabled.

* * * * *